(12) United States Patent
Tang et al.

(10) Patent No.: US 9,485,046 B1
(45) Date of Patent: Nov. 1, 2016

(54) OPTICAL SPOT ARRAY PITCH COMPRESSOR

(71) Applicant: Alliance Fiber Optic Products, Inc., Sunnyvale, CA (US)

(72) Inventors: Yuanji Tang, Sunnyvale, CA (US); Andy Fenglei Zhou, Fremont, CA (US); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 345 days.

(21) Appl. No.: 13/999,431

(22) Filed: Feb. 25, 2014

Related U.S. Application Data (60) Provisional application No. 61/853,787, filed on Apr. 12, 2013.

(51) Int. Cl.
*H04J 14/02* (2006.01)
*H04J 14/00* (2006.01)

(52) U.S. Cl.
CPC ............ *H04J 14/02* (2013.01); *H04J 14/0202* (2013.01)

(58) Field of Classification Search
USPC .......................................................... 398/86
See application file for complete search history.

(56) References Cited

U.S. PATENT DOCUMENTS

| | | | | |
|---|---|---|---|---|
| 2,651,715 A | * | 9/1953 | Hines ........................ | H01P 3/20 353/81 |
| 3,617,710 A | * | 11/1971 | Honeycutt .............. | H04B 10/00 359/349 |
| 4,627,690 A | | 12/1986 | Fantone | |
| 4,740,951 A | * | 4/1988 | Lizet .................. | G02B 6/12004 385/130 |
| 5,064,263 A | * | 11/1991 | Stein ..................... | G01J 3/0259 385/130 |
| 5,583,683 A | * | 12/1996 | Scobey .................. | G02B 5/288 359/587 |
| 6,201,908 B1 | | 3/2001 | Grann | |
| 6,728,488 B1 | * | 4/2004 | Peng ...................... | G02B 27/09 359/639 |
| 6,769,816 B2 | | 8/2004 | Capewell et al. | |
| 6,876,679 B1 | * | 4/2005 | Bowler .............. | G02B 6/29365 372/101 |
| 6,879,749 B2 | * | 4/2005 | Wong .................... | G02B 6/2713 385/24 |
| 7,023,620 B1 | | 4/2006 | Sandberg et al. | |
| 8,537,468 B1 | * | 9/2013 | Wang ................. | G02B 27/0025 359/619 |
| 8,576,480 B2 | * | 11/2013 | Yoshida .............. | H01S 3/06754 359/341.43 |
| 2006/0251422 A1 | * | 11/2006 | Liu ........................ | H04J 14/02 398/79 |
| 2014/0294386 A1 | * | 10/2014 | Shinada .................. | H04J 14/02 398/65 |
| 2015/0378186 A1 | * | 12/2015 | Xiong ..................... | G02F 1/093 359/484.04 |

OTHER PUBLICATIONS

Palmer et al., Diffraction Grating Handbook, 2005, Newport Corporation, sixth edition, p. 37.*
Burke, Michael W., Image Acquisition, 1996, Chapman & Hall, first edition, p. 418.*
Sun, Haiyin, Laser Diode Beam Basics, Manipulations and Characterizations, pp. 48-49.*

* cited by examiner

*Primary Examiner* — Ken N Vanderpuye
*Assistant Examiner* — Jai Lee
(74) *Attorney, Agent, or Firm* — Dinsmore & Shohl LLP (57) ABSTRACT

An apparatus comprises a passive wavelength division multiplexing (WDM) demultiplexer (DeMUX) or a passive WDM multiplexer (MUX), an active photo diode (PD) array or an active laser diode (LD) array, and a compressing device disposed between the passive WDM DeMUX or the passive WDM MUX and the active PD array or the active LD array. The compressing device changes the optical spot pitch of the passive WDM DeMUX or the passive WDM MUX to match the pitch of the active PD array or the active LD array. The compressing device may be a single optical wedge, a first and a second optical wedges, a plurality of optical wedges, or a grating. A compression ratio can be adjusted by changing the incident angle of the incident beam to the compressing device.

9 Claims, 6 Drawing Sheets

OPTICAL SPOT ARRAY PITCH COMPRESSOR

CROSS-REFERENCE TO RELATED APPLICATIONS

This application claims the benefit to U.S. Provisional Application No. 61/853,787, filed Apr. 12, 2013.

FIELD OF THE INVENTION

This invention relates to an optical spot array pitch compressor that compresses the optical spot array pitch of a passive wavelength division multiplexing (WDM) multiplexer (MUX) or demultiplexer (DeMUX) to match the pitch of an active laser diode (LD) array in a transmitter optical sub-assembly (TOSA) or photo diode (PD) array in a receiver optical sub-assembly (ROSA) and more specifically to an optical spot array pitch compressor that can compresses the optical spot array pitch with varying compression ratio.

BACKGROUND OF THE INVENTION

Wavelength division multiplexing (WDM) is used to increase the communication bandwidth or the number of communication channels in optical communications. A number of optical signals carried by light having different wavelengths are input and propagating in a single optical fiber. A WDM multiplexer (MUX) is used to combine a number of optical signals carried by light having different wavelengths into a fiber. To detect each signal, the combined light exiting from the fiber is decomposed into its components having different wavelengths using a WDM demultiplexer (DeMUX). Each component corresponds to an optical signal. Typically, the optical signals decomposed by the DeMUX form an optical spot array on a cross-section plane. The pitch of the array is determined by the DeMUX. The optical signals are detected by an array of photo diodes (PD) in a receiver optical sub-assembly (ROSA).

Similarly, an array of laser diodes (LD) in a transmitter optical sub-assembly (TOSA) emits optical signals. Typically, the optical signals emitted by the LD array in the TOSA form an optical spot array on a cross-section plane. The optical signals are combined by a WDM MUX into an optical fiber. Accordingly, the optical spot array pitch of the passive WDM MUX or DeMUX must match the optical spot array pitch of the active LD or PD array.

The pitch of an active LD or PD array may be 3.05 mm, which is the diameter of the transistor outline (TO) can for packaging LD or PD. On the other hand, the pitch of an active LD or PD array may be 0.25 mm for an integrated LD or PD. The pitch of an active LD and PD array may be any number, which is determined by the manufacture of the device. Similarly, the pitch of a passive WDM MUX and DeMUX may be any number as well, which is determined by its manufacturer. Accordingly, an optical spot array pitch compressor to match the pitch of a passive WDM MUX or DeMUX with the pitch of an active LD or PD array is required. Furthermore, the optical spot array pitch compressor must be able to provide a varying compressor ratio. Especially, when the passive WDM MUX and DeMUX and the active LD and PD array are not made based on the same specification, or are made by different manufacturers. It is appreciated that it is almost impossible to compress the optical spot pitch of a passive WDM MUX or DeMUX to as small as 0.25 mm pitch using traditional free space optics.

Figures 1, 2:
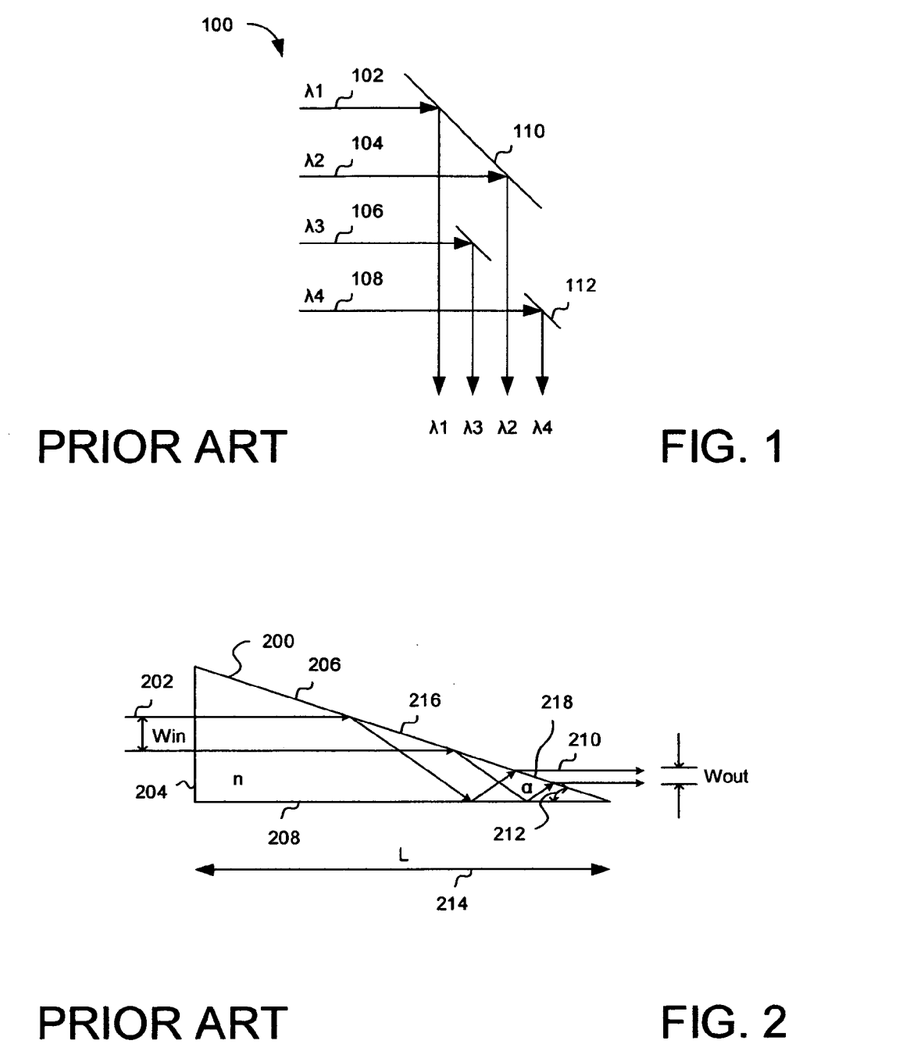
FIG. 1 shows a beam pitch compression using a group of mirror.
FIG. 2 shows a beam compression using an anamorphic prism.

U.S. Pat. No. 7,023,620 to Sandberg et al. discloses a device 100 to provide beam pitch compression using a group of mirror as shown in FIG. 1. Four beams 102, 104, 106, and 108 having wavelengths λ1, λ2, λ3, and λ4, respectively, are separated into a first group including beams 102 and 104, and a second group including beams 106 and 108. The first group including beams 102 and 104 is reflected 90° by a first mirror 110. The second group including beams 106 and 108 is reflected 90° by a second mirror 112. Second mirror 112 has a hole or window to allow beam 104 passing through. If there are more than four beams, second mirror 112 must have a periodical structure mirror-window-mirror-window to reflect beams of the second group and to transmit beams of the first group. Device 100 will change the order of beams 102, 104, 106, and 108 to a new order of beams 102, 106, 104, and 108. The special structure of second mirror 112 will increase the cost. Device 100 will have a fix compression ratio instead of a varying compression ratio.

U.S. Pat. No. 4,627,690 to Fantone discloses an anamorphic prism 200 for beam compression as shown in FIG. 2. An incident beam 202 enters anamorphic prism 200 normally from a right angle surface 204. After having two total internal reflections (TIR) at an inclined surfaces 206 and a flat surface 208, incident beam 202 is refracted from inclined surface 206 to the air becoming an output beam 210. Incident beam 202 originally has a beam diameter Win. Output beam 210 has a compressed beam diameter Wout. The compression ratio is Win/Wout. Anamorphic prism 200 requires the following conditions be satisfied.

$$n = \frac{\cos\alpha}{\cos 3\alpha}, \quad \text{Equation (1)}$$

$$\eta = \frac{W_{in}}{W_{out}} = 2 + \frac{1}{n}, \quad \text{Equation (2)}$$

where n is the refractive index of anamorphic prism 200, a is an apex angle 212 of anamorphic prism 200, and η is the compression ratio.

Apex angle 212, α, is determined in a range of 17° to 19° by the refractive index n. Compression ratio η, which is in a range of 2 to 3, is also determined by the refractive index n. Due to the small apex angle)(17°~19°, the prism must have a long length L 214 to fully transmit the beam through the prism. Furthermore, inclined surface 206 includes an area of TIR 216, which is not coated, and an area of refraction 218, which is anti-reflection (AR) coated. To separate two areas 216 and 218 in an AR coating process, the prism may not be small. Anamorphic prism 200 has a fix compression ratio instead of a varying compression ratio.

Accordingly, an optical spot array pitch compressor to match the pitch of a WDM MUX or DeMUX with the pitch of a LD or PD array, which is simple, small, low cost, and capable of providing a varying compression ratio, is desired.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 3:
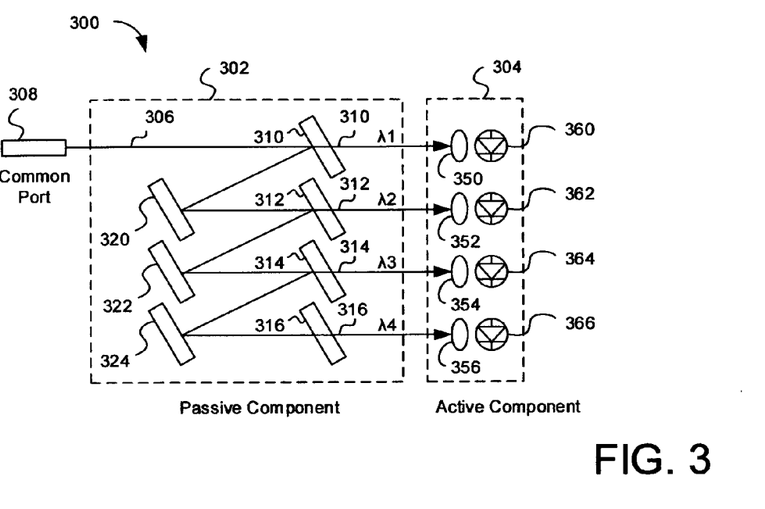
FIG. 3 shows a typical 4-channel ROSA including a zigzag WDM DeMUX.

A free space optical sub-assembly (OSA) integrates a passive component such as a WDM MUX or DeMUX and an active component such as a LD or PD array. A typical WDM MUX or DeMUX comprising thin film filters (TFF) is based on a zigzag optical path design. U.S. Pat. No. 6,201,908 to Grann and U.S. Pat. No. 6,769,816 to Capewell et al. show examples of a zigzag WDM DeMUX. FIG. 3 shows a typical 4-channel ROSA 300 including a zigzag WDM DeMUX.

ROSA 300 includes a passive WDM DeMUX 302 and an active PD array 304. Passive WDM DeMUX 302 includes four TFFs, 310, 312, 314, and 316, and three mirrors, 320, 322, and 324. Active PD array 304 includes four lenses 350, 352, 354, and 356, and four PDs, 360, 362, 364, and 366. A wavelength multiplexed beam 306 having λ1, λ2, λ3, and λ4 wavelengths is output from an optical fiber and enters into ROSA 300 through a common port 308. Beam 306 is directed to TFF 310. Light having wavelength λ1 is transmitted through TFF 310, focused by lens 350 and detected by PD 360. The rest of beam 306 is reflected by TFF 310 toward mirror 320. Beam 306 is directed to TFF 312 by mirror 320. Light having wavelength λ2 is transmitted through TFF 312, focused by lens 352 and detected by PD 362. The rest of beam 306 is reflected by TFF 312 toward mirror 322. Beam 306 is directed to TFF 314 by mirror 322. Light having wavelength λ3 is transmitted through TFF 314, focused by lens 354 and detected by PD 364. The rest of beam 306 is reflected by TFF 314 toward mirror 324. Beam 306 is directed to TFF 316 by mirror 324. Light having wavelength λ4 is transmitted through TFF 316, focused by lens 356 and detected by PD 366.

It is appreciated that ROSA and TOSA, in principle, have the same structure, but the optical path is reversed. Accordingly, FIG. 3 can be seen as a TOSA, in which the PD array is replaced with a LD array, and the optical path is reversed. Instead of a PD detecting light beam, a LD is emitting a light beam. Minor modification may further be made. For example, in a TOSA, TFF 316 or the last TFF may be removed. An optical isolator may be disposed at common port 308. In the disclosure, a ROSA is described in general, one skilled in the art would understand that the same principle applies to a TOSA as well, by reversing the optical path and replacing the PD array with a LD array.

Recently, the pitch of the active LD or PD array decreases while the pitch of optical spot array generated by a traditional WDM MUX or DeMUX comprising TFFs based on a zigzag optical path design does not significantly decrease because it is difficult to reduce the size of the traditional passive WDM MUX or DeMUX. The typical numbers for pitch of the active LD or PD array currently include 0.25, 0.5, 0.75, 1.5 and 3.05 mm. The TO can provides a pitch of 3.05 mm. However the integrated technique provides a pitch of 0.25 mm. Accordingly, a solution is sought to solve how to couple the optical spot array from a passive WDM MUX or DeMUX to an active LD or PD array.

Figure 4:
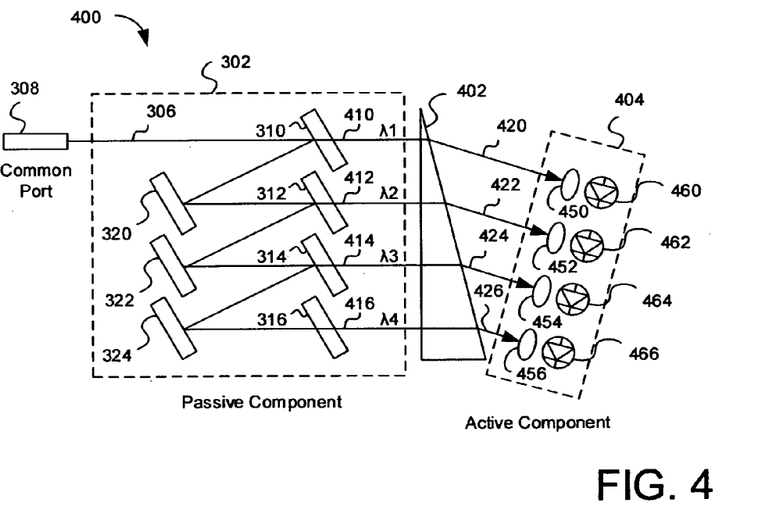
FIG. 4 shows an embodiment of a ROSA including an optical wedge between passive and active components.

FIG. 4 is an exemplary embodiment of an ROSA 400 including an optical wedge 402 between passive and active components, according to the present invention. FIG. 4 is essentially the same as FIG. 3. The difference between FIG. 4 and FIG. 3 is optical wedge 402 disposed between passive WDM DeMUX 302 and active PD array 404. A light beam 410 having wavelength λ1 is bent by optical wedge 402 becoming a light beam 420. A light beam 412 having wavelength λ2 is bent by optical wedge 402 becoming a light beam 422. A light beam 414 having wavelength λ3 is bent by optical wedge 402 becoming a light beam 424. A light beam 416 having wavelength λ4 is bent by optical wedge 402 becoming a light beam 426. The pitch of optical spot array of passive WDM DeMUX 302, which is the separation between beams 410 and 412, beams 412 and 414, and beams 414 and 416, is compressed by optical wedge 402. In other words, the separation between beams 420 and 422, beams 422 and 424, and beams 424 and 426 is smaller than the separation between beams 410 and 412, beams 412 and 414, and beams 414 and 416. Thus, PD array 404 having smaller pitch can be used.

It is appreciated that the number of light beams is not limited to four. Any number is possible. Accordingly, the number of mirrors and TFFs may be any number as well.

Figure 5:
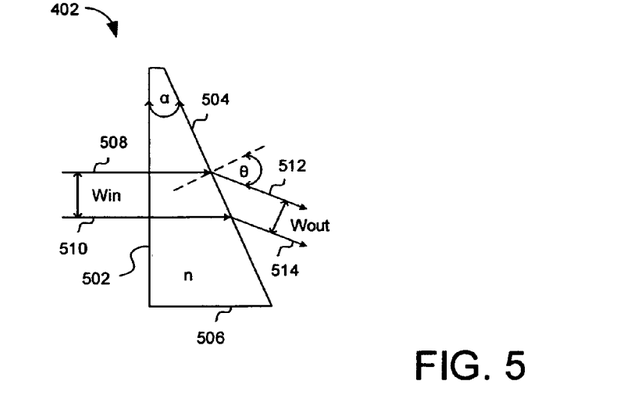
FIG. 5 shows an optical wedge having refractive index n, apex angle α, and output angle θ.

A compression ratio η is a function of refractive index n, apex angle α, and output angle θ, of optical wedge 402. FIG. 5 shows optical wedge 402 having refractive index n, apex angle α, and output angle θ, according to the present invention. Optical wedge 402 comprises a right angle surface 502, an inclined surface 504, and a flat surface 506. Incident beams 508 and 510 are incident normally on right angle surface 502, and transmitted through optical wedge 402, before they are bent becoming output beams 512 and 514, respectively, having output angle θ.

Figure 6:
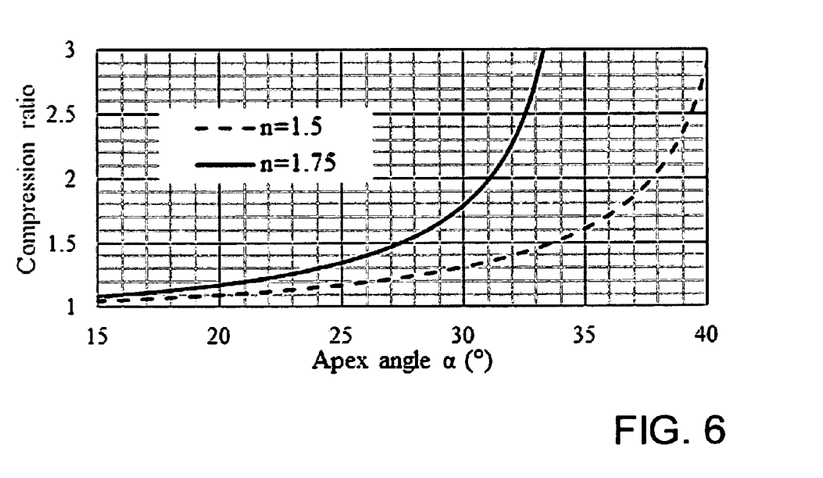
FIG. 6 shows plots of compression ratio as function of apex angle α for refractive index n=1.5 (broken line) and n=1.75 (solid line).

Since the incident beams are incident normally, compression ratio η, which is Win/Wout, is a function of refractive index n and apex angle α of optical wedge 402, as shown in FIG. 5. Win is a separation of two adjacent incident beams, and Wout is a separation of two adjacent output beams. Plots of compression ratio as function of apex angle α for refractive index n=1.5 (broken line) and n=1.75 (solid line) are shown in FIG. 6, according to the present invention. The compression ratio η as function of apex angle α and refractive index n is given in Equation 3.

$$\eta = \frac{\cos\alpha}{\cos[\sin^{-1}(n\sin\alpha)]},\qquad \text{Equation (3)}$$

Figure 7:
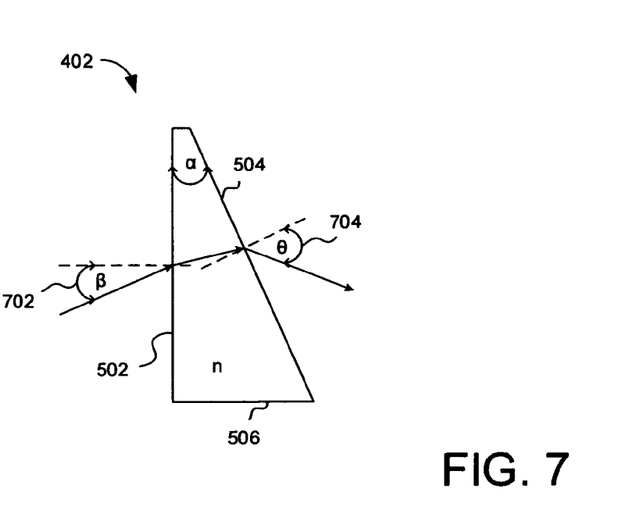
FIG. 7 shows light transmitting an optical wedge having incident angle β and output angle θ.
Figure 8:
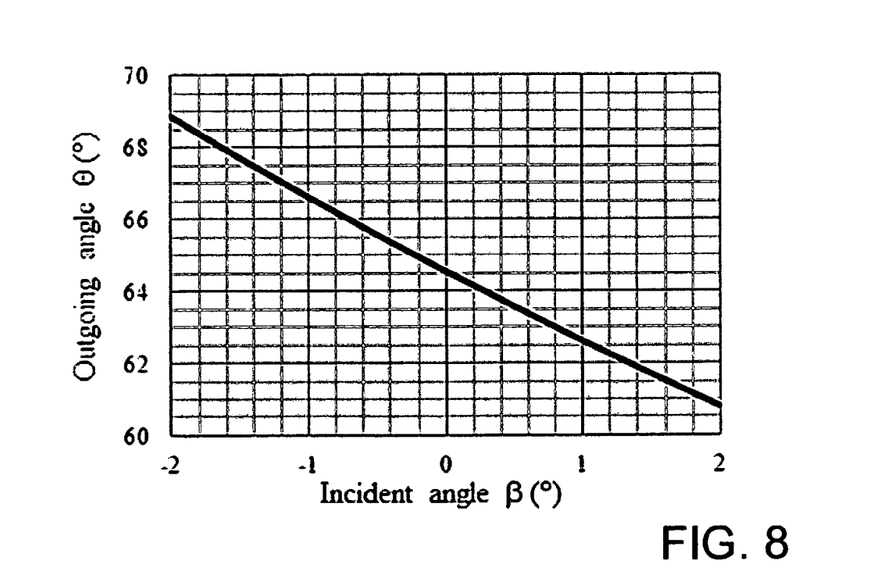
FIG. 8 shows a plot of output angle θ as function of incident angle β for refractive index n=1.748 and apex angle α=31.1°.

Increase in an incident angle 702, β, will change an output angle 704, θ, as shown in FIG. 7, according to the present invention. A plot showing the relationship of output angle θ and incident angle β for refractive index n=1.748 and apex angle α=31.1° is given in FIG. 8, according to the present invention. FIG. 8 shows that increase in incident angle β will result in decrease in output angle 9. The output angle θ as function of input angle β, apex angle α and refractive index n is given in Equation 4.

$$\theta = \sin^{-1}\left\{n\sin\left[\alpha - \sin^{-1}\left(\frac{\sin\beta}{n}\right)\right]\right\},\qquad \text{Equation (4)}$$

Figure 9:
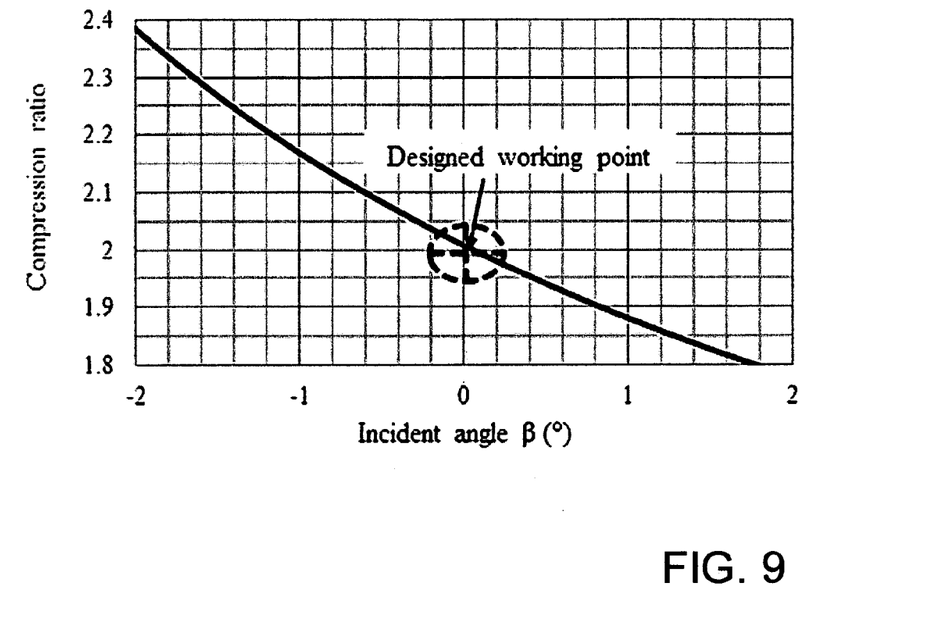
FIG. 9 shows a plot of compression ratio η as function of incident angle β.

FIG. 9 shows a plot of compression ratio η as function of incident angle β, according to the present invention. The plot in FIG. 9 is calculated using data of FIG. 8. FIG. 9 shows that for the incident angle range of β=−2° to β=1.8°, compression ratio is decreasing in the range η=2.4 to η=1.8. The compression ratio η as function of input angle β, apex angle α and refractive index n is given in Equation 5.

$$\eta = \frac{\cos\left[\alpha - \sin^{-1}\left(\frac{\sin\beta}{n}\right)\right]}{\cos\left[\sin^{-1}\left(\frac{\sin\beta}{n}\right)\right]} \times \frac{\cos\beta}{\cos\left\{\sin^{-1}\left[n\sin\left(\alpha - \sin^{-1}\left(\frac{\sin\beta}{n}\right)\right)\right]\right\}},\qquad \text{Equation (5)}$$

Accordingly, after a single optical wedge is made and disposed between the passive WDM DeMUX and the active PD array, the compression ratio can be adjusted by changing the incident angle as shown in Equation (5). A beam incident to the right angle surface of an optical wedge is refracted into the optical wedge. The beam is transmitted in the optical wedge and arriving at the inclined surface of the optical wedge, and is refracted to the air. Thus, no TIR occurs in the optical wedge. As mentioned previously, it is appreciated that the embodiment and the calculation may be applied to a TOSA comprising a passive WDM MUX and an active LD array by reversing the light path.

Figure 10:
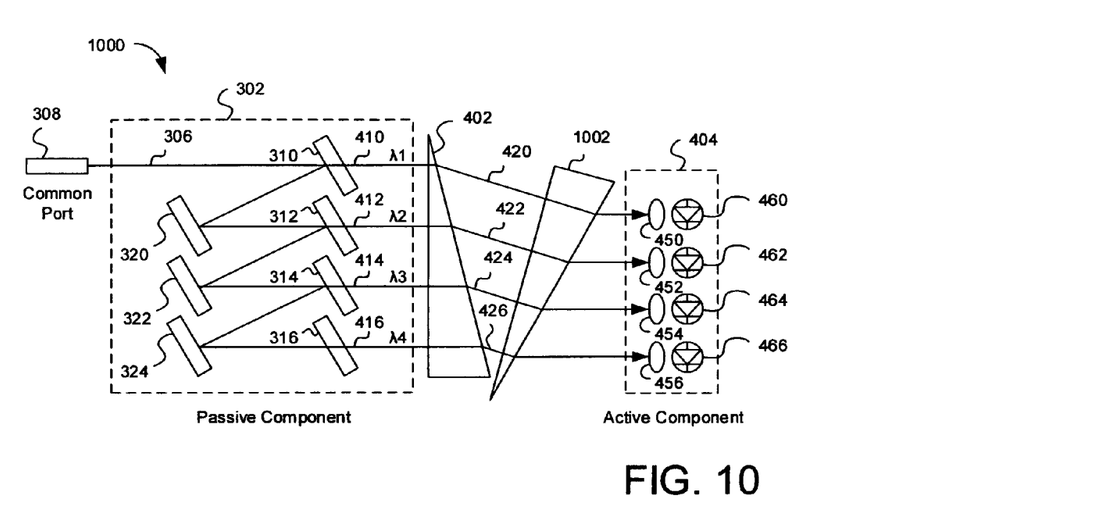
FIG. 10 shows an embodiment of a ROSA including two optical wedges between passive and active components.

FIG. 10 shows that a second optical wedge 1002 may be included in an exemplary embodiment 1000, according to the present invention. FIG. 10 is essentially the same as FIG. 4. The difference between FIG. 10 and FIG. 4 includes that second optical wedge 1002 is added between a first optical wedge 402 and PD array 404. Thus, embodiment 1000 of FIG. 10 provides a two level compression. The compression ratio of the two level compression of FIG. 10 is higher than the compression ratio of FIG. 4. Second optical wedge 1002 also compensates for some second order effects generated by first optical wedge 402, because the directions of optical wedge 1002 and optical wedge 402 are opposite. The compression ratio can be adjusted by changing the incident angle as described previously. A plurality of optical wedges may be included in an embodiment of the present invention to further increase the compression ratio.

Figure 11:
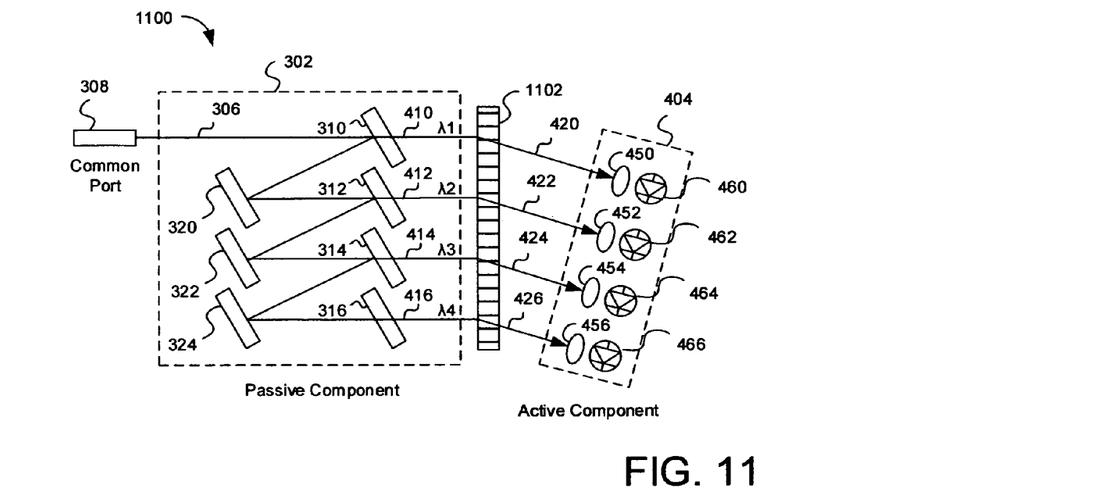
FIG. 11 shows an embodiment of a ROSA including a grating between passive and active components.

FIG. 11 shows an exemplary embodiment 1100 replacing optical wedge 402 with a grating 1102, according to the present invention. In FIG. 4, incident beams 410-416 are refracted by optical wedge 402 becoming bent output beams 420-426. Incident beams 410-416 may be diffracted by grating 1102 becoming bent output beams 420-426, as shown in FIG. 11. The compression ratio can be adjusted by changing the incident angle as well.

An apparatus is disclosed that comprises a passive WDM DeMUX or a passive WDM MUX, an active PD array or an active LD array, and a compressing device disposed between the passive WDM DeMUX or the passive WDM MUX and the active PD array or the active LD array. The compressing device changes the optical spot pitch of the passive WDM DeMUX or the passive WDM MUX to match the pitch of the active PD array or the active LD array. The compressing device may be a single optical wedge, a first and a second optical wedges, a plurality of optical wedges, or a grating. A compression ratio can be adjusted by changing the incident angle of the incident beam to the compressing device.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An apparatus comprising:
   one of a passive wavelength division multiplexing (WDM) demultiplexer (DeMUX) and a passive WDM multiplexer (MUX);
   one of an active photo diode (PD) array and an active laser diode (LD) array;
   a compressing device disposed between said one of a passive WDM DeMUX and a passive WDM MUX and said one of an active PD array and an active LD array;
   wherein the compressing device changes an optical spot pitch of said one of a passive WDM DeMUX and a passive WDM MUX to match a pitch of said one of an active PD array and an active LD array; and wherein a compression ratio can be adjusted by changing an incident angle of an incident beam to the compressing device;
wherein the compressing device is a single optical wedge; and
wherein the compression ratio can be adjusted by changing the incident angle of the incident beam to the single optical wedge according to equation:

$$\eta = \frac{\cos\left[\alpha - \sin^{-1}\left(\frac{\sin\beta}{n}\right)\right]}{\cos\left[\sin^{-1}\left(\frac{\sin\beta}{n}\right)\right]} \times \frac{\cos\beta}{\cos\left\{\sin^{-1}\left[n\sin\left(\alpha - \sin^{-1}\left(\frac{\sin\beta}{n}\right)\right)\right]\right\}},$$

where $\eta$ is the compression ratio, $\beta$ is the incident angle, $\alpha$ is an apex angle of the single optical wedge, and n is a refractive index of the single optical wedge.

2. The apparatus of claim 1, wherein said one of a passive WDM DeMUX and a passive WDM MUX comprises a plurality of thin film filters (TFF).

3. The apparatus of claim 1, wherein said one of a passive WDM DeMUX and a passive WDM MUX comprises a plurality of mirrors.

4. The apparatus of claim 1, wherein said one of an active PD array and an active LD array comprises a plurality of lenses.

5. A method for compressing an optical spot pitch of one of a passive wavelength division multiplexing (WDM) demultiplexer (DeMUX) and a passive WDM multiplexer (MUX) to match a pitch of one of an active photo diode (PD) array and an active laser diode (LD) array comprising:
disposing a compressing device between said one of a passive WDM DeMUX and a passive WDM MUX and said one of an active PD array and an active LD array;
wherein the compressing device changes an optical spot pitch of said one of a passive WDM DeMUX and a passive WDM MUX to match a pitch of said one of an active PD array and an active LD array; and
wherein a compression ratio can be adjusted by changing an incident angle of an incident beam to the compressing device;
wherein the compressing device is a single optical wedge;
wherein the compression ratio is adjusted by changing the incident angle of the incident beam to the single optical wedge according to equation:

$$\eta = \frac{\cos\left[\alpha - \sin^{-1}\left(\frac{\sin\beta}{n}\right)\right]}{\cos\left[\sin^{-1}\left(\frac{\sin\beta}{n}\right)\right]} \times \frac{\cos\beta}{\cos\left\{\sin^{-1}\left[n\sin\left(\alpha - \sin^{-1}\left(\frac{\sin\beta}{n}\right)\right)\right]\right\}},$$

where $\eta$ is the compression ratio, $\beta$ is the incident angle, $\alpha$ is an apex angle of the single optical wedge, and n is a refractive index of the single optical wedge.

6. An apparatus comprising:
one of a passive wavelength division multiplexing (WDM) demultiplexer (DeMUX) and a passive WDM multiplexer (MUX);
one of an active photo diode (PD) array and an active laser diode (LD) array;
a single optical wedge disposed between said one of a passive WDM DeMUX and a passive WDM MUX and said one of an active PD array and an active LD array;
wherein the single optical wedge changes an optical spot pitch of said one of a passive WDM DeMUX and a passive WDM MUX to match a pitch of said one of an active PD array and an active LD array; and
wherein a compression ratio can be adjusted by changing an incident angle of an incident beam to the single optical wedge according to equation:

$$\eta = \frac{\cos\left[\alpha - \sin^{-1}\left(\frac{\sin\beta}{n}\right)\right]}{\cos\left[\sin^{-1}\left(\frac{\sin\beta}{n}\right)\right]} \times \frac{\cos\beta}{\cos\left\{\sin^{-1}\left[n\sin\left(\alpha - \sin^{-1}\left(\frac{\sin\beta}{n}\right)\right)\right]\right\}},$$

where $\eta$ is the compression ratio, $\beta$ is the incident angle, $\alpha$ is an apex angle of the single optical wedge, and n is a refractive index of the single optical wedge.

7. The apparatus of claim 6, wherein said one of a passive WDM DeMUX and a passive WDM MUX comprises a plurality of thin film filters (TFF).

8. The apparatus of claim 6, wherein said one of a passive WDM DeMUX and a passive WDM MUX comprises a plurality of mirrors.

9. The apparatus of claim 6, wherein said one of an active PD array and an active LD array comprises a plurality of lenses.

* * * * *